March 8, 1955  J. N. LIEBMAN  2,703,475
RESERVE WINDING INDICATOR FOR TIMEPIECES
Filed June 23, 1954
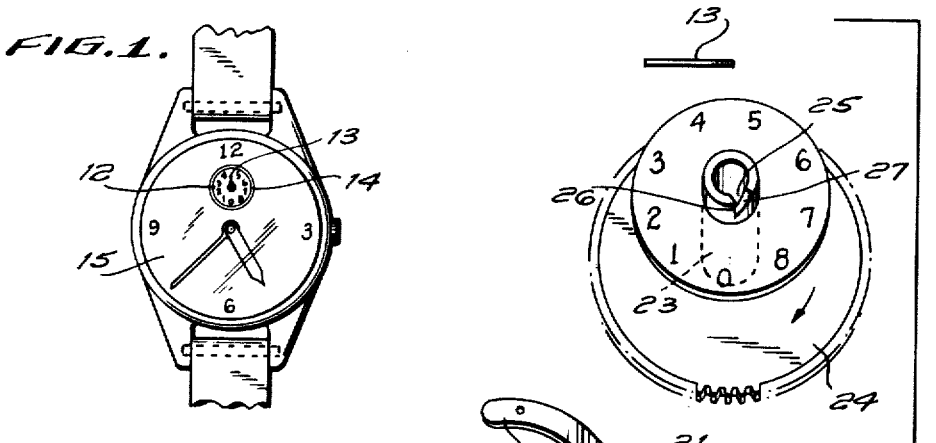
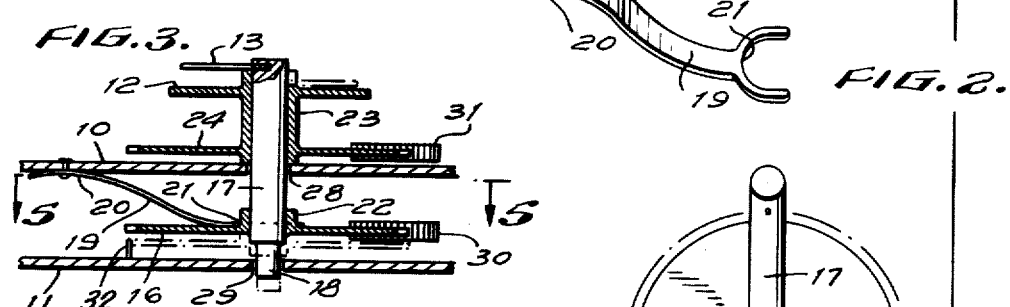
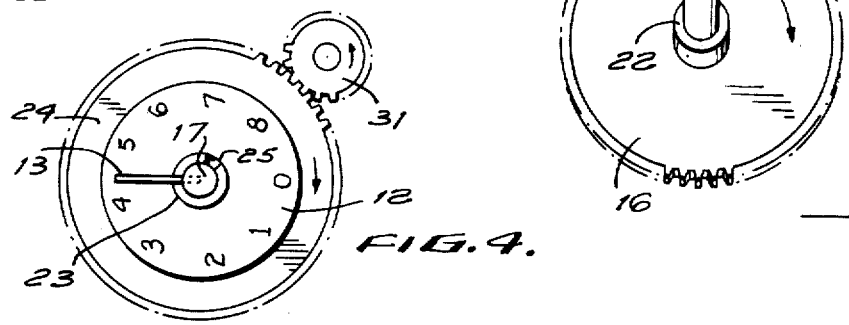
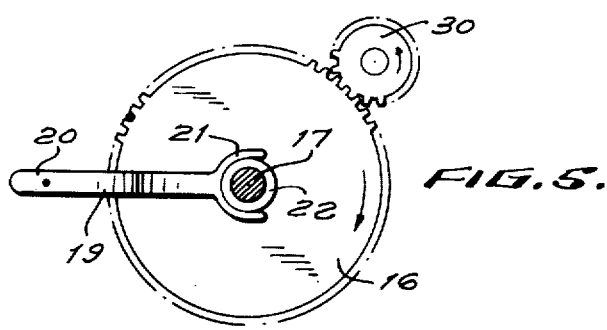
INVENTOR.
JOSEPH N. LIEBMAN
BY
ATTORNEY

United States Patent Office 2,703,475
Patented Mar. 8, 1955

2,703,475
RESERVE WINDING INDICATOR FOR TIMEPIECES

Joseph N. Liebman, North Miami Beach, Fla.

Application June 23, 1954, Serial No. 438,776

5 Claims. (Cl. 58—85)

This invention relates to a reserve winding indicator for a timepiece. While the indicator mechanism is intended primarily for application to self-winding watches, it may be applied to spring actuated self-winding automobile or vehicle clocks of the type described in my pending patent application Serial No. 424,884, filed April 22, 1954, and the like.

The principal object of the invention is to provide an indicator or gauge of simple and inexpensive construction that will tell at any given time the reserve or unwound spring power remaining in the mainspring of the timepiece to which the device is applied.

Another object is to provide an indicator mechanism consisting of only a very few parts, which parts are easy to manufacture and assemble.

Another object is to provide an indicator mechanism of simple design.

A further object is to provide an indicator mechanism of sturdy construction.

A still further object is to provide an indicator mechanism that can be easily repaired in case it should for any reason get out of order.

Other objects and advantages of the invention will appear from the following description thereof, reference being had to the accompanying drawings, in which:

Fig. 1 is a face view of a timepiece showing the indicator dial;

Fig. 2 is an exploded view in perspective showing the several parts that constitute the indicator mechanism;

Fig. 3 is a vertical cross-sectional view of the indicator mechanism mounted on the plates or bridges of a timepiece;

Fig. 4 is a top plan view of the unwinding wheel and dial of the indicator mechanism in engagement with an unwinding wheel of a timepiece; and Fig. 5 is a section on the line 5—5 of Fig. 3, showing the winding wheel of the indicator mechanism engaged with a winding wheel of the timepiece.

The drawings are somewhat schematic and are designed to facilitate an understanding of the invention. It will be understood by watchmakers that the dimensions, proportions, and arrangement of the several parts may be varied as required to fit any particular timepiece to which the indicator mechanism is to be applied.

The indicator mechanism is mounted on the plates or bridges 10—11 of the timepiece movement. The mechanism includes a dial 12 and an indicator hand 13 that are visible through a window 14 in the dial 15 of the timepiece. In the present instance the indicator mechanism is shown as applied to a self-winding wristwatch. The indicator dial 12 may be marked with numbers, as shown, or other suitable characters or markings, to gauge the amount of reserve power, if any, remaining in the mainspring at any given time. In the case of watches the characters will usually represent the number of hours that it can continue to run without rewinding, and in the case of clocks either the number of days or hours.

Having reference now particularly to Figs. 2 and 3 of the drawings, it will be seen that the indicator mechanism is of simple design, consisting of only a very few essential parts. In the form shown, it comprises a winding wheel 16 to which is fixed a central vertical cylindrical post or rod 17 having a foot portion 18 that is preferably of reduced diameter. A leaf spring 19 is attached at its upper end 20 to the plate or bridge 10 and has its lower free end 21 bearing on the upper face of the wheel 16, for the purpose hereinafter described.

As shown, the wheel 16 has a hub portion 22, and the lower end of the spring is bifurcated or concavely curved to embrace the hub. However, the hub may be eliminated and the free end of the spring may be differently shaped.

A sleeve 23 surrounds the upper end portion of the post 17 above the plate 10 to turn freely about the post. An unwinding wheel 24 is fixed to the lower end of the sleeve and the dial 12 is fixed to the upper end of the sleeve. The height of the sleeve 23 and the vertical spacing between the dial and wheel will of course depend upon the construction and arrangement of parts of the movement, as well as the thickness, of the timepiece to which the indicator mechanism is to be fitted. In some instances, dial 12, instead of being spaced above the wheel 24, may be applied, or the characters thereof inscribed, directly upon the upper surface of said wheel. The indicator hand or finger 13 is secured or threaded into the upper end of the post 17 to project at substantially a right angle to the axis of the post. A notch 25 is formed in the upper end of the sleeve 23 which notch has a vertical face 26 and an inclined face 27.

The post 17 projects through an opening 28 in the upper plate 10, and its foot or lower end 18 passes into an opening 29 in the lower plate 11. As will be explained later, the entire post may move vertically down and up to the extent of the depth of the notch 25 in the upper end of the sleeve 23. It will be evident, particularly from inspection of Figs. 2 and 3, that the parts of the mechanism may be very easily assembled and applied to the timepiece movement, or disassembled for purposes of repair, cleaning, or replacement of worn or damaged parts.

In assembly, the spring 19 is attached to plate 10, then the post with the wheel 16 thereto attached is passed into the openings in the two plates, after which the sleeve 23, with the dial 12 and wheel 23 attached thereto, is slipped over the post, and finally the hand or finger 13 is secured to the post to hold the sleeve in place. On disassembly, the hand or finger is disconnected from the post to permit of removing the sleeve, and taking the mechanism apart.

When the indicator mechanism is fitted to a timepiece movement the teeth of the winding wheel 16 will be meshed with those of a winding wheel 30, or of one of the train of winding gears, of the movement. The teeth of the unwinding wheel 24 will be similarly meshed with those of an unwinding wheel or gear 31 of the timepiece movement. Those operative connections between the timepiece movement and the indicator mechanism are represented in Figs. 4 and 5 of the drawings.

Operation of the mechanism is as follows: Assuming that the mainspring (not shown) is wholly unwound, the hand 13 will then point to the character or figure 0 on the dial 12. At that time, as will be noted, the hand will be positioned somewhat to the left of the vertical wall 26 of the notch 25 and does not enter the notch. Now as the mainspring is being wound the wheel or gear 30 of the timepiece movement will cause the winding wheel 16 of the indicator mechanism to turn clockwise. As the wheel 16 is fixed to the post 17, the latter as well as the hand 13 will turn in the same direction. Just as the mainspring is being fully wound the hand 13 will reach the notch 25 and will travel down its inclined wall to the bottom. This will cause the post 17 and wheel 16, actuated by pressure of the spring 19 on the latter, to drop downward to the position indicated by the dotted lines in Fig. 3, and will result in disengagement of wheel 16 from the timepiece winding wheel 30. A pin or detent 32 is disposed on the plate 11 in position to engage between two adjacent teeth of wheel 16 in its lowered position and thus temporarily arrest any further turning movement of that wheel and of the post 17 fixed to the wheel. When the mainspring is completely wound the hand 13 will point to the number 8 on the dial, or to such other number or character that may be used to designate the wound condition of the mainspring. As the mainspring unwinds, and as the post 17 is held temporarily immobile, clockwise turning movement of the unwinding wheel 24 of the indicator mechanism will cause the hand 13 to ride upward on the inclined face of notch 25 and so restore the post and wheel 16 to their normal up position in which the wheel 16 is again meshed with the timepiece wheel 30. The wheel 24 then continues to turn freely, and to turn the dial 12 with it, until the mainspring is again wholly unwound at which time the hand 13 will again point to 0 on the dial, so completing the cycle from unwound, to wound, and back to unwound condition of the mainspring.

The wheels 16 and 24 both turn in the same direction, although their turning movements are wholly independent of each other. This is evident from the fact that the wheel 24 is fixed to the sleeve 23 that is supported to turn freely on the post 17. While in the particular mechanism illustrated, both wheels turn in clockwise direction, it is possible that they might turn in the opposite direction depending upon the direction in which the wheels 30 and 31 of the timepiece movement turn.

In the case of self-winding watches and clocks, relative turning movement of the wheels 16 and 24 of the indicator mechanism depends upon whether, at any given moment, the winding or the unwinding action of the timepiece movement exerts the greater force. If both exert equal force, then no movement of either wheel 16 or wheel 24 of the indicator mechanism will occur.

The extreme simplicity of construction of the indicator mechanism of this invention permits of such a mechanism being embodied in inexpensive self-winding wrist-watches and other timepieces that have not heretofore been equipped with such a device.

While the member 13 is designed to serve both as an indicator hand and as a means for lowering and raising the post, the latter is its more important function. Accordingly it need not be of a length to serve as a hand but merely long enough to ride in the groove 25 of the sleeve 23. In the latter event any suitable marking may be applied to the timepiece dial 15 to point to the characters of the indicator dial 12 in lieu of the hand.

The upper end of the sleeve 23, except at its notch, has a smooth flat surface over which the member 13 may ride or slide with a minimum of friction.

What I claim is:

1. A reserve winding indicator mechanism for a self-winding timepiece, said mechanism comprising a toothed wheel, a post to which the wheel is fixed and that extends axially through the center thereof, a sleeve surrounding and freely turnable about the upper end of the post, a second toothed wheel and a dial fixed to the sleeve and extending perpendicularly to its axis, a projection extending at a right-angle from the upper end of the post and riding on the top of the sleeve, a notch in the top of the sleeve, said notch having an inclined face that provides a ramp upon which the projection can ride into and out of the notch, on riding into the notch the post and its attached toothed wheel drop down to the extent of the depth of the notch, and on riding out of the notch the post and its attached wheel are raised to their up position, and resilient means acting on the first mentioned toothed wheel to move it axially out of engagement with the winding wheel of the timepiece movement as the projection rides down into the notch.

2. A reserve winding indicator mechanism for a self-winding timepiece, said mechanism comprising a toothed wheel, a post to which the wheel is fixed and that extends axially through the center thereof, a sleeve surrounding and freely turnable about the upper end of the post, a second toothed wheel and a dial fixed to the sleeve and extending perpendicularly to its axis, a projection extending at a right-angle from the upper end of the post and riding on the top of the sleeve, a notch in the top of the sleeve, said notch having an inclined face that provides a ramp upon which the projection can ride into and out of the notch, on riding into the notch the post and its attached toothed wheel drop down to the extent of the depth of the notch, and on riding out of the notch the post and its attached wheel are raised to their up position, a spring bearing on the first mentioned wheel to urge the wheel and post downward upon entry of the projection into the notch, and a detent for engaging said wheel to prevent it from turning while in its down position.

3. A reserve winding indicator mechanism for a self-winding timepiece, said mechanism comprising two parallel plates, a toothed wheel, a post to which the wheel is fixed and that extends axially through the center thereof, a sleeve surrounding and freely turnable about the upper end of the post, a second toothed wheel and a dial fixed to the sleeve and extending perpendicularly to its axis, a projection extending at a right-angle from the upper end of the post and riding on the top of the sleeve, a notch in the top of the sleeve, said notch having an inclined face that provides a ramp upon which the projection can ride into and out of the notch, on riding into the notch the post and its attached toothed wheel drop down to the extent of the depth of the notch, and on riding out of the notch the post and its attached wheel are raised to their up position, said mechanism being mounted on two parallel plates one above the other with the post passing through alined openings in the two, the first mentioned toothed wheel being disposed above the upper surface of the lower plate, a detent extending upward from the lower plate for engagement between two adjacent teeth of said first wheel to prevent it from turning while in its down position, a spring having one end fixed to the upper plate and having its free end bearing on said first wheel to urge the wheel and post downward on entry of the projection into the notch, said sleeve and second toothed wheel being disposed above the upper plate.

4. A reserve winding indicator mechanism for a self-winding timepiece, as set forth in claim 1, in which the first toothed wheel is in engagement with a winding wheel of the timepiece movement while the timepiece is being wound and becomes disengaged therefrom by dropping below the plane of said winding wheel when the timepiece is fully wound, and in which the second toothed wheel is in engagement with an unwinding wheel of the timepiece movement.

5. A reserve winding indicator mechanism for a self-winding timepiece, as set forth in claim 1, in which the dial has characters to indicate steps from the completely wound to the wholly wound condition of the timepiece mainspring, and in which the projection extends over the dial to provide a hand for indicating the condition of winding at any given time.

References Cited in the file of this patent

FOREIGN PATENTS 8,513     France _____ Feb. 11, 1908
(Addition to No. 384,015)

UNITED STATES PATENT OFFICE

CERTIFICATE OF CORRECTION

Patent No. 2,703,475

March 8, 1955

Joseph N. Liebman

It is hereby certified that error appears in the printed specification of the above numbered patent requiring correction and that the said Letters Patent should read as corrected below.

Column 4, line 55, for "wound", second occurrence, read -- unwound --.

Signed and sealed this 19th day of April, 1955.

(SEAL)
Attest:

E. J. MURRY

Attesting Officer

ROBERT C. WATSON
Commissioner of Patents